United States Patent Office 3,752,872
Patented Aug. 14, 1973

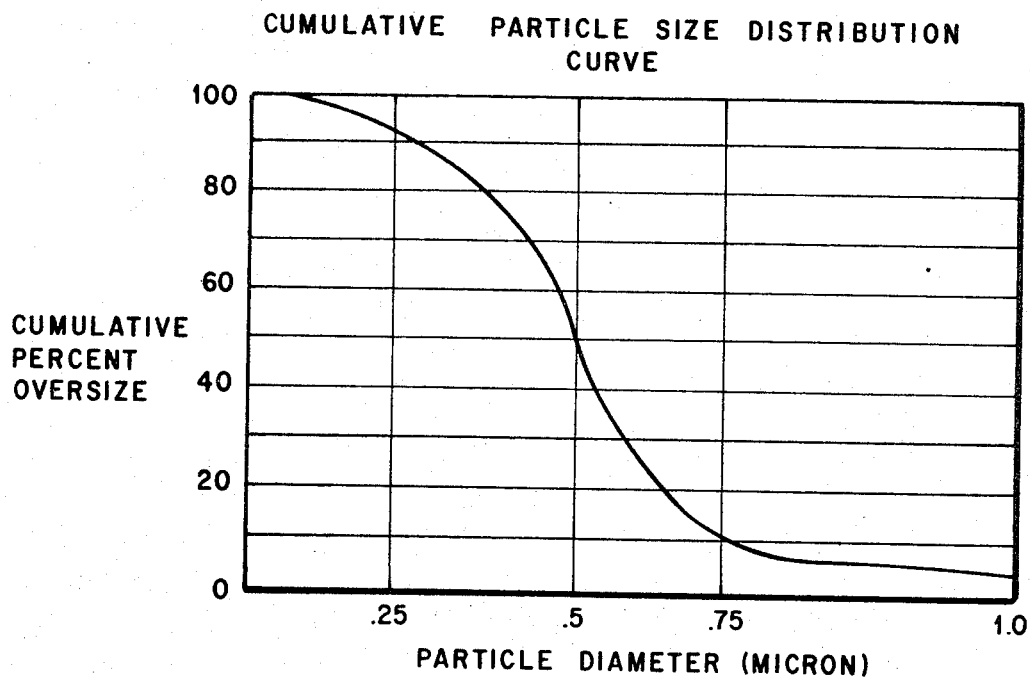

3,752,872
METHOD OF PREPARING UNIFORM SIZE POWDERS
Howard W. Hill, Fremont, Mickey O. Marlowe, Livermore, and Alexis I. Kaznoff, Castro Valley, Calif., assignors to the United States of America as represented by the United States Atomic Energy Commission
Filed Aug. 26, 1971, Ser. No. 175,155
Int. Cl. G21c 21/02, 21/12
U.S. Cl. 264—.5      1 Claim

ABSTRACT OF THE DISCLOSURE

A method for preparing inorganic powders consisting of particles of uniform controlled size in the range 0.2 to 40 microns is described. The procedure utilizes isostatic forming and high temperature sintering to form grains of the desired size. The compact then is disintegrated by cyclic oxidation-reduction to separate the grains along grain boundaries thus preserving the identity of the grains. These grains form the particles of the new powder. The procedure is applicable to $UO_2$ or other compounds of multivalent cations.

CONTRACTUAL ORIGIN

This invention resulted under Department of Interior Contract Number 14–12–436 with the General Electric Company.

BACKGROUND OF THE INVENTION

This invention relates to a chemical technique for preparing uniform size inorganic powders.

Powders of uniform size are particularly useful in the uranium fuel technology arts, and are also desirable in other phases of ceramic and metallurgy technology, such as grinding and abrasive media processing, filter material fabrication and composite material processing.

The various methods applicable for making powders, whether involving chemical or mechanical principles, produce powders of varying diameter. Very small size particle powders can be produced by chemical reactions, particularly by precipitation processes. Even so, the individual particles vary extensively in diameter. Likewise, larger size particles obtained by such techniques as mechanically breaking up still larger formations of material are invariably of nonuniform size.

Generally to obtain uniform size powder involves adopting separation methods that give results which are not entirely satisfactory. A method in prevalent use is to pass nonuniform powder through a series of different sieves and collect the powder between two adjacent sieves. Another method is to separate particles out of a fluidized bed of powder on the basis of their mass which reflects the size of the particles. Another method entails collecting dispersed ionized particles according to weight which is a function of the size. However, these methods and others suffer from the common disadvantage that the collected particles vary in size over a range too wide to constitute uniform powder. Further, these methods reflect waste since considerable powder being outside the desirable range would be unavailable for use. Thus a method which succeeds in producing powder of a substantially uniform size and at the same time converts undesirable size powder to a size which is desirable as well as uniform throughout would be a notable scientific achievement.

SUMMARY OF THE INVENTION

We have provided a procedure to allow particles of inorganic compounds to be prepared in a size which can be controlled in the range of 0.2 to 40 microns. The procedure has potential applicability to the preparation of powders of any compound which is formed of one or more multivalent elements. The procedure consists of (a) compacting a refractory powder made up of particles having a smaller size than desired to be produced, (b) heating the compact to effect a sintering and controlled grain growth and (c) then converting to uniform powder by separating the enlarged grains along their boundaries.

DETAILED DESCRIPTION OF THE INVENTION

According to our process, compositions of matter can be selected and produced as particulates in the desired size range. The process entails growing grains of the size desired by sintering green compacts made up of particles with a smaller size than desired. Very small size particles (less than 0.5 microns) are readily available since this is invariably the size powder which appears in the usual powder metallurgy production techniques. However, if not small enough, the powder can be crushed mechanically to produce the smaller size particles required to successfully carry out the process.

It follows then that the best size of $UO_2$ particles with which to start the process is one with as small a spread in powder size as can be found. $UO_2$ or other inorganic compounds produced by standard chemical techniques is normally suitable starting material for making powder larger than 0.2 microns diameter size. In preparing the powder for pressing, the powder is compacted into a pellet shape having a density of about 4–7 g./cm.³. Compaction can be performed by uniaxial or isostatic pressing at pressures of 5,000–100,00 p.s.i. Isostatic pressing serves to improve the uniformity of the microstructure in the pressed compact, which results in more uniformly sized particles in the final products.

A new set of variables for sintering temperatures and time at temperatures will have to be established for each different starting material varying in average particle size. The starting material in Table II and Table III for Samples 1–10 is $UO_2$ powder having an estimated crystallite size between 0.05 and 0.5 mm. and for Samples 11–17 $UO_2$ having an estimated crystallite size between 0.05 and 0.3 mm. The data in the tables show a general decrease in the surface area (increase in diameter) with increasing sintering temperature and/or time at temperature. The grain growth of the sintered compact can be readily controlled since the increase in size is gradual over the sintering temperature range. The increase of surface area with the number of oxidation-reduction cycles indicates larger aggregates are being broken apart. Sizes which have been produced by various $UO_2$ heat treatments are cited in Table I.

After the compact is sintered it is then disintegrated to powder. The preferred method is by subjecting the sintered compact to repeated oxidation-reduction cycles. In this method of forming a powder the oxidation is carried out by heating the compact in an atmosphere which causes the metal to attain a higher valence state, and reduction is accomplished by heating the oxidized compact in an atmosphere which causes the metal to return to the former valence state. The degree of disintegration can be ascertained by inspection with a scanning electron microscope. An additional treatment to more completely convert the partially sintered compact to individual grains is to expose the oxidized-reduced aggregates to sonic shocks causing the aggregates to break up along the grain edges.

By oxidizing the sintered pellet, for example oxidizing a $UO_2$ pellet to $U_3O_8$, disintegration of the pellet occurs because of the very large forces created by the volume change in going from $UO_2$ to the lower density $U_3O_8$. The changes in crystal structure (cubic to orthohombic) and in density (10.97 to 8.38 g./cm.³) associated with $UO_2$ to $U_3O_8$ conversion are sufficient to cause the compact to disintegrate. We have found that breakdown of the pellet occurs principally along the grain boundaries when the pellet is heated in air at temperatures around 600° C. for a period of time of up to 6 hours. The powder produced in this way is then ground lightly to complete the separation of particles. The oxidized powder is now reduced to $UO_2$ by heating with dry hydrogen at the same temperature and time period as for oxidation. Reduction causes a further disintegration to powder. The oxidation-reduction cycle can be repeated as many times as needed to obtain complete fracturing of the grain along the grain boundaries. Examples of the narrow particle size distribution obtained by this technique for $UO_2$ are listed in Table III.

Variations of the same process may produce uniform powders of oxides, nitrides, sulphides, phosphides and other compounds of the multivalent elements. The key step to be tried for each potential compound is the disintegration of the sintered body into individual grains without less of the grain identity. For $UO_2$ this has been done by oxidation to $U_3O_8$ and reduction back to $UO_2$. For UN it is accomplished by nitriding the sintered body to $UN_2$ and then reducing back to UN. Other examples are obvious.

EXAMPLE OF SPECIFIC EMBODIMENT OF THE INVENTION

The following is the procedure used to make 0.5 micron diameter powder, corresponding to Sample 8 in the tables. Starting material is commercial grade $UO_2$ powder having a crystallite size range between 0.05 and 0.5 The powder is formed into pellet shapes one inch long and one inch in diameter by two directional pressing at about 12,500 p.s.i. Isostatic pressing of the pellet at about 50,000 p.s.i. produces a green compact with uniform density about 50% of theoretical. The green compact is sintered at 1200° C. for 4 hours, and then is subjected to 4 oxidation-reduction cycles. Oxidation is carried out by heating the compact in an oxygen-containing atmosphere; reduction is accomplished by heating the oxidized compact in a hydrogen atmosphere. Oxidation temperature and time at the temperature is 600° C. and 6 hours respectively; for reduction the temperature is 600° C. and the time period is 4 hours. The powder obtained after the fourth cycle averaged 0.5 micron particle diameter size when inspected by the scanning electron microscope. The standard deviation of the particles was shown by the scanning electron microscope to be 0.21 micron. The drawing depicts a graph indicating the estimated particle size distribution curve for the powder.

TABLE I

[Grain size of $UO_2$ resulting from variation of sintering times and temperatures]

| Sample | Sintering temperature (° C.) | Treatment time (hours) | Average grain diameter in sintered compacts (microns) |
|---|---|---|---|
| A | 1,500 | 3 | 3.0 |
| B | 1,600 | 4½ | 8.0 |
| C | 1,735 | 40 | 18.0 |
| 4 | 1,400 | 1 | 4.0 |
| 3 | 1,500 | 0 | 2.6 |
| 2 | 1,500 | 1 | 5.4 |
| 1 | 1,500 | 2 | 4.0 |

TABLE II

[Size of $UO_2$ powder resulting from variation of sintering time and temperature and oxidation-reduction cycles]

| Sample | Sintering conditions | | Oxidation-reduction cycles (no.) | Surface area of particle (M²/g.) |
|---|---|---|---|---|
| | Temperature (° C.) | Time (hours) | | |
| 1 | 1,500 | 2 | 1 | 1.86 |
| 2 | 1,500 | 1 | 1 | 2.12 |
| 3 | 1,500 | 0 | 1 | 1.64 |
| 4 | 1,400 | 1 | 1 | 2.01 |
| 5 | 1,300 | 2 | (1) | (1.88) |
| 5 | 1,300 | 2 | (2) | (2.15) |
| 5 | 1,300 | 2 | (3) | (2.29) |
| 5 | 1,300 | 2 | 4 | 2.57 |
| 6 | 1,300 | 1 | (1) | (1.90) |
| 6 | 1,300 | 1 | (2) | (1.91) |
| 6 | 1,300 | 1 | (3) | (2.39) |
| 6 | 1,300 | 1 | 4 | 2.69 |
| 7 | 1,200 | 4 | 4 | 2.37 |
| 8 | 1,200 | 2 | 4 | 3.42 |
| 9 | 1,000 | 4 | 4 | 2.68 |
| 10 | 1,000 | 2 | 4 | 3.06 |
| 11 | 1,300 | 2 | 4 | 4.05 |
| 12 | 1,300 | 1 | 4 | 3.09 |
| 13 | 1,200 | 4 | 4 | 3.44 |
| 14 | 1,200 | 2 | 4 | 4.92 |
| 15 | 1,000 | 4 | 4 | 2.48 |
| 16 | 1,000 | 2 | 4 | 5.09 |

NOTE.—Values in parentheses are results of measurements made at intermediate steps in oxidation-reduction cycle.

TABLE III

[Particle diameters—scanning electron microscope measurements]

| Sample | Mean diameter (microns) | Standard deviation (microns) | Standard error of mean (microns) |
|---|---|---|---|
| 10 | 0.36 | 0.11 | 0.04 |
| 9 | 0.36 | 0.13 | 0.04 |
| 8 | 0.52 | 0.21 | 0.07 |
| 7 | 0.46 | 0.19 | 0.06 |
| 6 | 0.55 | 0.17 | 0.06 |
| 5 | 0.54 | 0.21 | 0.07 |
| 1 | 0.53 | 0.24 | 0.08 |
| 12 | 0.58 | 0.30 | 0.1 |
| 11 | 0.43 | 0.13 | 0.04 |
| 15 | 0.34 | 0.11 | 0.04 |
| 14 | 0.40 | 0.12 | 0.04 |
| 17 | 0.45 | 0.12 | 0.04 |
| 16 | 0.40 | 0.07 | 0.03 |

What is claimed is:

1. A process for preparing $UO_2$ powder of 0.5 micron size comprising forming a green compact from $UO_2$ powder having an average crystallite size between 0.05 and 0.5 micron by applying about 50,000 p.s.i. of isostatic pressure to a pellet of the powder, sintering the green compact at about 1200° C. for about 4 hours, oxidizing the sintered compact with oxygen at about 600° C. for about 6 hours, reducing the oxidized compact with hydrogen at about 600° C. for about 4 hours, and repeating the oxidation and reduction steps until the compact is disintegrated to 0.5 micron size powder.

References Cited

UNITED STATES PATENTS

| 3,288,595 | 11/1966 | Reichard | 23—355 X |
| 3,140,151 | 7/1964 | Foltz et al. | 23—355 |
| 3,094,377 | 6/1963 | Langrod | 23—355 |
| 3,309,322 | 3/1967 | Anselin et al. | 264—0.5 |

FOREIGN PATENTS

| 686,364 | 5/1964 | Canada | 264—0.5 |
| 246,320 | 1/1961 | Australia | 264—0.5 |

BENJAMIN R. PADGETT, Primary Examiner

R. GAITHER, Assistant Examiner

U.S. Cl. X.R.

423—254